United States Patent
Sun et al.

(10) Patent No.: US 9,743,284 B2
(45) Date of Patent: Aug. 22, 2017

(54) SPECTRUM ALLOCATION METHOD AND DEVICE

(71) Applicant: Huawei Technologies Co., Ltd., Shenzhen, Guangdong (CN)

(72) Inventors: Lixin Sun, Shenzhen (CN); Sha Ma, Beijing (CN); Xuelong Wang, Beijing (CN); Juan Zheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 132 days.

(21) Appl. No.: 14/598,015

(22) Filed: Jan. 15, 2015

(65) Prior Publication Data

US 2015/0139050 A1    May 21, 2015

Related U.S. Application Data

(63) Continuation of application No. PCT/CN2012/078826, filed on Jul. 18, 2012.

(51) Int. Cl.
| | | |
|---|---|---|
| *H04L 1/00* | (2006.01) | |
| *H04W 16/10* | (2009.01) | |
| *H04L 5/14* | (2006.01) | |
| *H04W 72/00* | (2009.01) | |
| *H04W 72/04* | (2009.01) | |

(Continued)

(52) U.S. Cl.
CPC ............ *H04W 16/10* (2013.01); *H04L 5/14* (2013.01); *H04W 72/005* (2013.01); *H04W 72/0453* (2013.01); *H04W 16/14* (2013.01); *H04W 88/08* (2013.01)

(58) Field of Classification Search
CPC ..... H04W 16/14; H04W 24/00; H04W 28/26; H04W 72/04; H04W 72/0453; H04W 60/00; H04W 72/00; H04W 72/10; H04W 72/06; H04W 72/1226; H04W 88/08; G06F 17/30442; H04H 20/42; H04L 27/0006; H04J 1/16
USPC ............... 370/328, 329, 252, 338, 462, 311; 455/454, 509, 67.11, 67.13, 226.1, 455/232.1–234.1, 452.2, 114.2, 423, 522, 455/450
See application file for complete search history.

(56) References Cited

U.S. PATENT DOCUMENTS

| | | |
|---|---|---|
| 2007/0117537 A1 | 5/2007 | Hui et al. |
| 2008/0090581 A1 | 4/2008 | Hu |
| 2010/0009695 A1 | 1/2010 | Kwon et al. |

(Continued)

FOREIGN PATENT DOCUMENTS

| | | |
|---|---|---|
| CN | 101765121 A | 6/2010 |
| CN | 101931877 A | 12/2010 |

(Continued)

*Primary Examiner* — Dady Chery
(74) *Attorney, Agent, or Firm* — Fish & Richardson P.C.

(57) ABSTRACT

Embodiments of the present invention relate to a spectrum allocation method and device. The method includes: determining, by a first base station, according to first broadcast information sent by at least one second base station, usage of a preferred frequency band of the at least one second base station; and determining, by the first base station, according to the usage of the preferred frequency band of the at least one second base station, use of the preferred frequency band of the at least one second base station by the first base station. Therefore, it is implemented that a spectrum resource utilization ratio is improved.

18 Claims, 4 Drawing Sheets

(51) Int. Cl.
  *H04W 16/14* (2009.01)
  *H04W 88/08* (2009.01)

(56) References Cited

U.S. PATENT DOCUMENTS

| | | |
|---|---|---|
| 2010/0284289 A1 | 11/2010 | Suo et al. |
| 2011/0002275 A1 | 1/2011 | Shousterman |
| 2011/0287802 A1* | 11/2011 | Ma ................ H04L 5/0066 455/517 |
| 2012/0264472 A1 | 10/2012 | Nobukiyo |

FOREIGN PATENT DOCUMENTS

| | | |
|---|---|---|
| CN | 102170642 A | 8/2011 |
| WO | WO 2011/078039 A1 | 6/2011 |

* cited by examiner

SPECTRUM ALLOCATION METHOD AND DEVICE

CROSS REFERENCE TO RELATED APPLICATIONS

This application is a continuation of International Application No. PCT/CN2012/078826, filed on Jul. 18, 2012, which is hereby incorporated by reference in its entirety.

TECHNICAL FIELD

The present invention relates to the field of communications technologies, and in particular, to a spectrum allocation method and device.

BACKGROUND

Spectrum allocation is a basis of wireless communications, and devices of multiple operators in a same geographical area need to coordinate spectrum allocation, so as to reduce mutual interference.

In the prior art, a preferred frequency band resource which is temporarily idle for a device of a certain operator may be used by a device of another operator. However, in order to avoid interference caused when the device of the operator owning the frequency band re-uses the preferred frequency band, the device of the other operator needs to use the preferred frequency band in low power to serve a user equipment. When the device of the operator owning the frequency band re-uses the preferred frequency band, the device of the other operator needs to release the temporarily used frequency band resource. However, in the prior art, the preferred frequency band resource idle for the device of the operator cannot be fully used, and a spectrum resource utilization ratio is low.

SUMMARY

The present invention provides a spectrum allocation method and device, so as to improve a spectrum resource utilization ratio.

In one aspect, a spectrum allocation method is provided and includes:

determining, by a first base station, according to first broadcast information sent by at least one second base station, usage of a preferred frequency band of the at least one second base station; and determining, by the first base station, according to the usage of the preferred frequency band of the at least one second base station, use of the preferred frequency band of the at least one second base station by the first base station.

With reference to the foregoing aspect and any possible implementation manner, an implementation manner is further provided, where the determining, by a first base station, according to first broadcast information sent by at least one second base station, usage of a preferred frequency band of the at least one second base station includes: if the first base station obtains the first broadcast information sent by the second base station, determining, by the first base station, that the second base station uses the preferred frequency band of the second base station to transmit data; if the first base station does not obtain the first broadcast information sent by the second base station, determining, by the first base station, that the second base station does not use the preferred frequency band of the second base station to transmit data; or if the first base station obtains the first broadcast information sent by the second base station, determining, by the first base station, that the second base station uses the preferred frequency band of the second base station to transmit data; if the first base station obtains the first broadcast information sent by the second base station, determining, by the first base station, that the second base station does not use the preferred frequency band of the second base station to transmit data; or if the first broadcast information includes usage information of the preferred frequency band of the second base station, determining, by the first base station, according to the usage information of the preferred frequency band of the second base station, that the second base station uses/does not use the preferred frequency band of the second base station to transmit data.

With reference to the foregoing aspect and any possible implementation manner, an implementation manner is further provided, where the determining, by the first base station, according to the usage of the preferred frequency band of the at least one second base station, use of the preferred frequency band of the at least one second base station by the first base station includes: if the first base station determines, according to the first broadcast information, that the second base station does not use or uses a part of the preferred frequency band of the second base station to transmit data, determining, by the first base station, to transmit data on all or a part of the preferred frequency band of the second base station; or if the first base station determines, according to the first broadcast information, that the second base station uses the preferred frequency band of the second base station to transmit data, determining, by the first base station, to exit from all or a part of the used preferred frequency band of the second base station.

With reference to the foregoing aspect and any possible implementation manner, an implementation manner is further provided, where after the determining, by the first base station, to exit from all or a part of the used preferred frequency band of the second base station, the method further includes: exiting, by the first base station, from the all or the part of the used preferred frequency band of the second base station after first set time.

With reference to the foregoing aspect and any possible implementation manner, an implementation manner is further provided, where after the determining, by the first base station, to transmit data on all or a part of the preferred frequency band of the second base station, the method further includes: synchronizing the first base station with any base station in an area to which the first base station belongs.

With reference to the foregoing aspect and any possible implementation manner, an implementation manner is further provided, where the synchronizing the first base station with any base station in an area to which the first base station belongs includes: obtaining, by the first base station, according to a synchronization channel and/or a synchronization sequence of any base station in the area to which the first base station belongs, synchronization information of any base station in the area to which the first base station belongs, where the synchronization channel and/or the synchronization sequence is sent on a public frequency band in the area to which the first base station belongs, or is sent on a part of a preferred frequency band of any base station in the area to which the first base station belongs.

With reference to the foregoing aspect and any possible implementation manner, an implementation manner is further provided, where the method further includes: transmitting, by the first base station, data on a preferred frequency band of the first base station.

With reference to the foregoing aspect and any possible implementation manner, an implementation manner is further provided, where before the transmitting, by the first base station, data on a preferred frequency band of the first base station, the method further includes: obtaining, by the first base station, second broadcast information sent by at least one third base station, where the second broadcast information carries usage information of the preferred frequency band of the first base station by the third base station.

With reference to the foregoing aspect and any possible implementation manner, an implementation manner is further provided, where the transmitting, by the first base station, data on a preferred frequency band of the first base station includes: if the first base station determines, according to the usage information of the preferred frequency band of the first base station by the third base station, that the third base station transmits data on the preferred frequency band of the first base station, transmitting, by the first base station, data on the preferred frequency band of the first base station after second set time.

With reference to the foregoing aspect and any possible implementation manner, an implementation manner is further provided, where the method further includes: sending, by the first base station, third broadcast information, where the third broadcast information includes usage information of the preferred frequency band of the second base station by the first base station.

With reference to the foregoing aspect and any possible implementation manner, an implementation manner is further provided, where the first broadcast information sent by the second base station is sent on a declaring channel, and the declaring channel occupies the public frequency band in the area to which the first base station belongs, or occupies the preferred frequency band of the second base station; and/or, the third broadcast information sent by the first base station is sent on the declaring channel, and the declaring channel occupies the public frequency band in the area to which the first base station belongs, or occupies the preferred frequency band of the first base station; and/or, the second broadcast information sent by the third base station is sent on the declaring channel, and the declaring channel occupies the public frequency band in the area to which the first base station belongs, or occupies a preferred frequency band of the third base station.

With reference to the foregoing aspect and any possible implementation manner, an implementation manner is further provided, where if the declaring channel occupies the public frequency band in the area to which the first base station belongs, the first broadcast information sent by the at least one second base station, and/or the third broadcast information sent by the first base station, and/or the second broadcast information sent by the third base station performs orthogonality in any one or more combined manners: a time division manner, a frequency division manner, a code division manner, or a space division manner.

With reference to the foregoing aspect and any possible implementation manner, an implementation manner is further provided, where the first broadcast information further includes time division duplexing TDD ratio information used by the second base station, and/or, the third broadcast information further includes TDD ratio information used by the first base station, and/or, the second broadcast information further includes TDD ratio information used by the third base station.

In another aspect, a first base station is further provided and includes:

a receiving unit, configured to obtain first broadcast information sent by at least one second base station; and a processor, configured to determine, according to the first broadcast information, usage of a preferred frequency band of the at least one second base station; and determine, according to the usage of the preferred frequency band of the at least one second base station, use of the preferred frequency band of the at least one second base station by the first base station.

With reference to the foregoing aspect and any possible implementation manner, an implementation manner is further provided, where the processor is specifically configured to: if the receiving unit obtains the first broadcast information sent by the second base station, determine that the second base station uses the preferred frequency band of the second base station to transmit data; if the receiving unit does not obtain the first broadcast information sent by the second base station, determine that the second base station does not use the preferred frequency band of the second base station to transmit data; or if the receiving unit does not obtain the first broadcast information sent by the second base station, determine that the second base station uses the preferred frequency band of the second base station to transmit data; if the receiving unit obtains the first broadcast information sent by the second base station, determine that the second base station does not use the preferred frequency band of the second base station to transmit data; or if the first broadcast information obtained by the receiving unit includes usage information of the preferred frequency band of the second base station, determine, according to the usage information of the preferred frequency band of the second base station, that the second base station uses/does not use the preferred frequency band of the second base station to transmit data.

With reference to the foregoing aspect and any possible implementation manner, an implementation manner is further provided, where the processor is specifically configured to: if it is determined, according to the first broadcast information, that the second base station does not use or uses a part of the preferred frequency band of the second base station to transmit data, determine to transmit data on all or a part of the preferred frequency band of the second base station; or if it is determined, according to the first broadcast information, that the second base station uses the preferred frequency band of the second base station to transmit data, determine to exit from all or a part of the used preferred frequency band of the second base station.

With reference to the foregoing aspect and any possible implementation manner, an implementation manner is further provided, where the processor is further configured to exit from the all or the part of the used preferred frequency band of the second base station after first set time.

With reference to the foregoing aspect and any possible implementation manner, an implementation manner is further provided, where the processor is further configured to synchronize with any base station in an area to which the base station belongs.

With reference to the foregoing aspect and any possible implementation manner, an implementation manner is further provided, where the processor is specifically configured to obtain, according to a synchronization channel and/or a synchronization sequence of any base station in the area to which the base station belongs, synchronization info/Ration of any base station in the area to which the base station belongs, where the synchronization channel and/or the synchronization sequence is sent on a public frequency band in the area to which the base station belongs, or is sent on a part of a preferred frequency band of any base station in the area to which the base station belongs.

With reference to the foregoing aspect and any possible implementation manner, an implementation manner is further provided, where the processor is further configured to transmit data on a preferred frequency band of the first base station.

With reference to the foregoing aspect and any possible implementation manner, an implementation manner is further provided, where the receiving unit is further configured to obtain second broadcast information sent by at least one third base station, where the second broadcast information carries usage information of the preferred frequency band of the first base station by the third base station.

In the foregoing base station, the processor is further configured to, if it is determined, according to the usage information of the preferred frequency band of the first base station by the third base station, that the third base station transmits data on the preferred frequency band of the base station, transmit data on the preferred frequency band of the base station after second set time.

With reference to the foregoing aspect and any possible implementation manner, an implementation manner is further provided, where the base station further includes:

a sending unit, configured to send third broadcast information, where the third broadcast information includes usage information of the preferred frequency band of the second base station by the base station.

With reference to the foregoing aspect and any possible implementation manner, an implementation manner is further provided, where the first broadcast information sent by the second base station is sent on a declaring channel, and the declaring channel occupies the public frequency band in the area to which the base station belongs, or occupies the preferred frequency band of the second base station; and/or, the third broadcast information sent by the sending unit is sent on the declaring channel, and the declaring channel occupies the public frequency band in the area to which the base station belongs, or occupies the preferred frequency band of the base station; and/or, the second broadcast information sent by the third base station is sent on the declaring channel, and the declaring channel occupies the public frequency band in the area to which the base station belongs, or occupies a preferred frequency band of the third base station.

With reference to the foregoing aspect and any possible implementation manner, an implementation manner is further provided, where if the declaring channel occupies the public frequency band in the area to which the base station belongs, the first broadcast information sent by the at least one second base station, and/or the third broadcast information sent by the sending unit, and/or the second broadcast information sent by the third base station performs orthogonality in any one or more combined manners: a time division manner, a frequency division manner, a code division manner, or a space division manner.

With reference to the foregoing aspect and any possible implementation manner, an implementation manner is further provided, where the first broadcast information further includes time division duplexing TDD ratio information used by the second base station, and/or, the third broadcast information further includes TDD ratio information used by the base station, and/or, the second broadcast information further includes TDD ratio information used by the third base station.

In another aspect, a first base station is further provided and includes:

a detecting unit, configured to determine, according to first broadcast information sent by at least one second base station, usage of a preferred frequency band of the at least one second base station; and a determining unit, configured to determine, according to the usage of the preferred frequency band of the at least one second base station, use of the preferred frequency band of the at least one second base station by the first base station.

With reference to the foregoing aspect and any possible implementation manner, an implementation manner is further provided, where the detecting unit is specifically configured to: if the first broadcast information sent by the second base station is obtained, determine that the second base station uses the preferred frequency band of the second base station to transmit data; if the first broadcast information sent by the second base station is not obtained, determine that the second base station does not use the preferred frequency band of the second base station to transmit data; or if the first broadcast information sent by the second base station is not obtained, determine that the second base station uses the preferred frequency band of the second base station to transmit data; if the first broadcast information sent by the second base station is obtained, determine that the second base station does not use the preferred frequency band of the second base station to transmit data; or if the first broadcast information includes usage information of the preferred frequency band of the second base station, determine, according to the usage information of the preferred frequency band of the second base station, that the second base station uses/does not use the preferred frequency band of the second base station to transmit data.

With reference to the foregoing aspect and any possible implementation manner, an implementation manner is further provided, where the determining unit is specifically configured to: if the detecting unit determines, according to the first broadcast information, that the second base station does not use or uses a part of the preferred frequency band of the second base station to transmit data, determine to transmit data on all or a part of the preferred frequency band of the second base station; or if the detecting unit determines, according to the first broadcast information, that the second base station uses the preferred frequency band of the second base station to transmit data, determine to exit from all or a part of the used preferred frequency band of the second base station.

With reference to the foregoing aspect and any possible implementation manner, an implementation manner is further provided, where the base station further includes: a first processing unit, configured to, after the determining unit determines to exit from all or a part of the used preferred frequency band of the second base station, exit from the all or the part of the used preferred frequency band of the second base station after first set time.

With reference to the foregoing aspect and any possible implementation manner, an implementation manner is further provided, where the base station further includes: a second processing unit, configured to, after the determining unit determines to transmit data on all or a part of the preferred frequency band of the second base station, synchronize with any base station in an area to which the base station belongs.

With reference to the foregoing aspect and any possible implementation manner, an implementation manner is further provided, where the second processing unit is specifically configured to obtain, according to a synchronization channel and/or a synchronization sequence of any base station in the area to which the base station belongs, synchronization information of any base station in the area to which the base station belongs, where the synchronization channel and/or the synchronization sequence is sent on a public frequency band in the area to which the base station belongs, or is sent on a part of a preferred frequency band of any base station in the area to which the base station belongs.

With reference to the foregoing aspect and any possible implementation manner, an implementation manner is further provided, where the base station further includes: a third processing unit, configured to transmit data on a preferred frequency band of the base station.

With reference to the foregoing aspect and any possible implementation manner, an implementation manner is further provided, where the detecting unit is further configured to obtain second broadcast information sent by at least one third base station, where the second broadcast information carries usage information of the preferred frequency band of the first base station by the third base station.

With reference to the foregoing aspect and any possible implementation manner, an implementation manner is further provided, where the determining unit is further configured to determine, according to the usage information of the preferred frequency band of the base station by the third base station, that the third base station transmits data on the preferred frequency band of the base station; and the third processing unit is specifically configured to, if the determining unit determines that the third base station transmits data on the preferred frequency band of the base station, transmit data on the preferred frequency band of the base station after second set time.

With reference to the foregoing aspect and any possible implementation manner, an implementation manner is further provided, where the base station further includes: a sending unit, configured to send third broadcast information, where the third broadcast information includes usage information of the preferred frequency band of the second base station by the first base station.

With reference to the foregoing aspect and any possible implementation manner, an implementation manner is further provided, where the first broadcast information sent by the second base station is sent on a declaring channel, and the declaring channel occupies the public frequency band in the area to which the base station belongs, or occupies the preferred frequency band of the second base station; and/or, the third broadcast information sent by the sending unit is sent on the declaring channel, and the declaring channel occupies the public frequency band in the area to which the base station belongs, or occupies the preferred frequency band of the base station; and/or, the second broadcast information sent by the third base station is sent on the declaring channel, and the declaring channel occupies the public frequency band in the area to which the base station belongs, or occupies a preferred frequency band of the third base station.

With reference to the foregoing aspect and any possible implementation manner, an implementation manner is further provided, where if the declaring channel occupies the public frequency band in the area to which the base station belongs, the first broadcast information sent by the at least one second base station, and/or the third broadcast information sent by the sending unit, and/or the second broadcast information sent by the third base station performs orthogonality in any one or more combined manners: a time division manner, a frequency division manner, a code division manner, or a space division manner.

With reference to the foregoing aspect and any possible implementation manner, an implementation manner is further provided, where the first broadcast information further includes time division duplexing TDD ratio information used by the second base station, and/or, the third broadcast information further includes TDD ratio information used by the first base station, and/or, the second broadcast information further includes TDD ratio information used by the third base station.

In the spectrum allocation method and device provided by the present invention, a base station may determine, by using broadcast information issued by another base station, usage of a preferred frequency band of the another base station, to determine use of the preferred frequency band of the another base station, thereby improving a spectrum resource utilization ratio.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Technologies described herein may be used in various communication systems, for example, current 2G, 3G communication systems and next generation communication systems, for example, a global system for mobile communications (GSM, Global System for Mobile communications), a code division multiple access (CDMA, Code Division Multiple Access) system, a time division multiple access (TDMA, Time Division Multiple Access) system, a wideband code division multiple access (WCDMA, Wideband Code Division Multiple Access) system, a frequency division multiple access (FDMA, Frequency Division Multiple Access) system, an orthogonal frequency division multiple access (OFDMA, Orthogonal Frequency-Division Multiple Access) system, a single carrier FDMA (SC-FDMA) system, a general packet radio service (GPRS, General Packet Radio Service) system, a long term evolution (LTE, Long Term Evolution) system, and other communication systems of this type.

A first base station and a second base station involved in the embodiments of the present invention may both refer to a device which is in an access network and communicates with a wireless terminal through one or more sectors on an air interface. The first base station and the second base station may be configured to perform mutual conversion on a received air frame and an IP packet, so as to be used as a router between the wireless terminal and a remaining part of the access network, where the remaining part of the access network may include an Internet protocol (IP) network. The first base station and the second base station may also coordinate attribute management of the air interface. For example, a base station may be a base station (BTS, Base Transceiver Station) in GSM or CDMA, may also be a base station (NodeB) in WCDMA, or may also be an evolutional base station (NodeB or eNB or e-NodeB, evolutional Node B) in LTE, which is not limited in the present application.

In addition, the terms "system" and "network" herein may be generally interchangeably used. The term "and/or" herein is only an association relationship for describing associated objects, and represents that three relationships may exist, for example, A and/or B may represent that: A exists alone, A and B exist at the same time, and B exists alone. In addition, the character "I" herein generally represents that the former and latter associated objects are in an "or" relationship.

Figure 1:
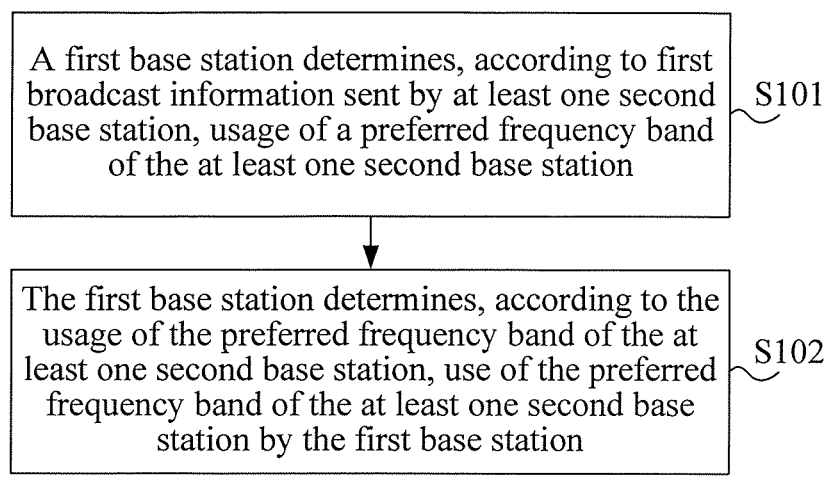
FIG. 1 is a flowchart of an embodiment of a spectrum allocation method provided by the present invention.

FIG. 1 is a flowchart of an embodiment of a spectrum allocation method provided by the present invention, where as shown in FIG. 1, the method includes:

S101: A first base station determines, according to first broadcast information sent by at least one second base station, usage of a preferred frequency band of the at least one second base station.

S102: The first base station determines, according to the usage of the preferred frequency band of the at least one second base station, use of the preferred frequency band of the at least one second base station by the first base station.

In the embodiment of the present invention, the first base station and each second base station belong to different operators. Each base station may indicate usage of its own preferred frequency band by sending a broadcast message. In this embodiment, a broadcast message sent by the second base station is a first broadcast message.

Figure 2:
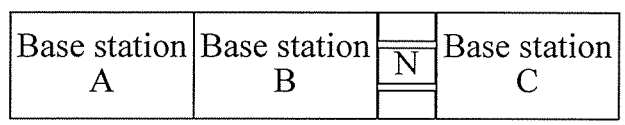
FIG. 2 is a schematic diagram of allocation of a preferred frequency band and a public frequency band of each base station provided by the present invention.

A mechanism or an entity having resource allocation and management functions, for example, a device such as a radio committee and a mobility management entity (Mobility Management Entity, MME), may allocate a nonoverlapping preferred frequency band to each operator in frequency band resources to be allocated in a certain area. As shown in FIG. 2, a base station A, a base station B, and a base station C belong to different operators, and a frequency band resource occupied by each base station is a respective preferred frequency band.

As a feasible implementation manner, the mechanism or the entity having the resource allocation and management functions may also set and obtain, by dividing, a public frequency band in the frequency band resources to be allocated, such as a public frequency band N shown in FIG. 2, and the public frequency band is used to bear a declaring channel used by each base station to send a broadcast information, where the declaring channel may be used by base stations of multiple operators to issue their respective broadcast information without interference, for example, the first broadcast information sent by the second base station.

Optionally, on the declaring channel, the broadcast information sent by the base stations of multiple operators, for example, first broadcast information sent by multiple second base stations may implement orthogonality in a manner, such as time division multiplexing, frequency division multiplexing, code division multiplexing, or space multiplexing, may also implement orthogonality in a combined form of the foregoing manners, and may also implement orthogonality in other multiplexing manners, so as to implement that broadcast information of a base station of each operator is sent on the declaring channel without interference.

As another feasible implementation manner, the mechanism or the entity having the resource allocation and management functions may also obtain, by dividing the preferred frequency band allocated to each operator, a part of resources for sending of the declaring channel, that is, the base station of each operator may use a part of its own preferred frequency band as the declaring channel for sending the broadcast information. For example, the second base station may use a part of its own preferred frequency band as the declaring channel for sending the first broadcast information.

It should be noted that, for the broadcast information sent by the base stations of different operators on the declaring channel, for example, the first broadcast information sent by each second base station, in order to prevent time division duplexing (Time Division Duplexing, TDD) systems of adjacent frequency bands from generating interference, the first broadcast information may be sent by adopting a sub-frame where a fixed downlink sub-frame in the TDD system is located, for example, sent on one or more sub-frames in 0, 1, 5, and 6 sub-frames, and in order to facilitate the base stations of different operators to detect the first broadcast information in short time, the first broadcast information may be sent by adopting relatively large transmit power.

Optionally, the first broadcast information may be periodically sent, or may be sent when usage of the preferred frequency band of the second base station is changed, or may be sent under a scenario that usage of a preferred frequency band of another base station by the second base station is changed.

Correspondingly, the first base station may periodically obtain first broadcast information sent by the second base station. A period of sending the first broadcast information by the second base station, and a period of obtaining the first broadcast information by the first base station may be configured by the mechanism or the entity having the resource allocation and management functions.

In the embodiment of the present invention, the first base station may read the first broadcast information sent by the at least one second base station on the declaring channel. As a feasible implementation manner, the first base station may pre-obtain, in a predefined manner, a resource occupied by the first broadcast information of the at least one second base station, that is, the base station of each operator may pre-acquire, by using configuration information, a resource occupied by broadcast information issued by a base station of another operator on the declaring channel. The resource occupied by the broadcast information may be one or any combination of a time resource, a frequency resource, a code word resource, and a space resource, or may be other orthogonalization resources, which is not limited here. The first base station may read the first broadcast information sent by the at least one second base station on different resources of the declaring channel; and as another feasible implementation manner, the first base station may also obtain, in a manner of blind detection on the declaring channel, the broadcast information sent by the at least one second base station.

Optionally, if a certain second base station does not send first broadcast information, it may be used to indicate that the second base station does not use its own preferred frequency band. Under this implementation scenario, if the first base station obtains the first broadcast information sent by the second base station, the first base station may determine that the second base station uses (which may indicate that all or a part is already used, or all or a part will be used) the preferred frequency band of the second base station to transmit data; on the contrary, if the first base station does not obtain the first broadcast information sent by the second base station, the first base station may determine that the second base station does not use the preferred frequency band of the second base station to transmit data.

Optionally, if a certain second base station sends first broadcast information, it may be used to indicate that the second base station does not use its own preferred frequency band. Under this implementation scenario, if the first base station does not obtain the first broadcast information sent by the second base station, the first base station may determine that the second base station uses (which may indicate that all or a part is already used, or all or a part will be used) the preferred frequency band of the second base station to transmit data; and if the first base station obtains the first broadcast information sent by the second base station, the first base station may determine that the second base station does not use the preferred frequency band of the second base station to transmit data.

Optionally, no matter whether the second base station uses its own preferred frequency band, the second base station may send the first broadcast information, where the first broadcast information may carry usage information of the preferred frequency band of the second base station, and the usage information of the preferred frequency band may include information such as information of whether the second base station uses the preferred frequency band, and a use ratio of the preferred frequency band of the second base station. Under this implementation scenario, the first base station may determine, according to the usage information of the preferred frequency band, that the second base station uses/does not use the preferred frequency band of the second base station to transmit data.

Further, the first base station may determine, according to the usage of the preferred frequency band of the at least one second base station, use of the preferred frequency band of the at least one second base station by the first base station.

Under an implementation scenario, the first base station needs to transmit data, for example, under a scenario that the operator prepares to deploy the first base station, if the first base station determines, according to the first broadcast information, that the second base station does not use or uses a part of the preferred frequency band of the second base station to transmit data, the first base station may transmit data on all or a part of the preferred frequency band of the second base station. It should be noted that, the first base station may directly determine, according to the first broadcast information, whether a certain second base station uses a preferred frequency band of the certain second base station, so that the first base station may use the preferred frequency band of the second base station by using power same or close to power of using a preferred frequency band of the first base station, thereby fully using the preferred frequency band of the second base station.

Under another implementation scenario, if the first base station already uses a preferred frequency band of a certain second base station, the first base station determines, according to the first broadcast information, that the second base station uses the preferred frequency band of the second base station to transmit data, the first base station may exit from all or a part of the used preferred frequency band of the second base station, where the exiting herein may be that the first base station releases the all or the part of the used preferred frequency band of the second base station.

After the first base station determines, according to the usage of the preferred frequency band of the at least one second base station, the use of the preferred frequency band of the at least one second base station by the first base station, the first base station may send third broadcast information, where the third broadcast information includes the usage information of the preferred frequency band of the second base station by the first base station, for example, under a scenario that the first base station transmits data on all or a part of the preferred frequency band of the second base station, the third broadcast information may carry information that the first base station uses the preferred frequency band of the second base station; and under a scenario that the first base station exits from all or a part of the used preferred frequency band of the second base station, the third broadcast information may carry information that the first base station does not use the preferred frequency band of the second base station.

Similar to the first broadcast information sent by the second base station, the third broadcast information may be sent on the declaring channel occupying the public frequency band, or may be sent on the declaring channel occupying a part of the preferred frequency band of the first base station. Optionally, the third broadcast information may be periodically sent, or may be sent when usage of the preferred frequency band of the first base station is changed, or may be sent under a scenario that usage of a preferred frequency band of another base station by the first base station is changed. A period of sending the third broadcast information by the first base station may be configured by the mechanism or the entity having the resource allocation and management functions.

It should be noted that, the broadcast information sent by each base station, for example, the first broadcast information sent by each second base station or the third broadcast information sent by the first base station, may further include information such as basic information of a preferred frequency band allocated to each base station, and a use ratio of the preferred frequency band allocated to each base station. In addition, the broadcast information may further include basic information of the base station, which includes, but is not limited to: a frequency band used by the base station, a bandwidth, a frame number, an adopted TDD ratio, service load information of the base station of the operator, a service type serving a user (which includes, but is not limited to, a voice service and a data service), a service level, and other system information broadcast by the existing base station, for example, a master information block (Master Information Block, MIB) in the existing system, and information carried by a system information block (System Information Block, SIBs), for example, the first broadcast information may further include time division duplexing TDD ratio information used by the second base station, and the third broadcast information may further include time division duplexing TDD ratio information used by the first base station.

In addition, the first broadcast information and the third broadcast information involved in the embodiment of the present invention not only may be obtained by the base stations of different operators, but also may be obtained by user equipments served by the base stations of different operators, and may also be directly obtained by different operators. For example, a user equipment may obtain, through detection on the declaring channel, broadcast information sent by a serving base station and a base station of another operator, to assist the user equipment to perform handover in advance, or to perform interference coordination between the user equipments served by different operators, or to assist the user equipment to perform operations of other aspects, which is not limited herein.

It should be noted that, the base stations of different operators may also perform a coordination interaction operation through the declaring channel, so that the base stations of different operators may better serve the user equipment. For example, in a certain geographical area, the user equipments served by the base stations of different operators may have different features, for example, a user equipment served by a base station of an operator A has a relatively large requirement on a downlink service, which requires that the serving base station selects a TDD ratio having more downlink sub-frames as a basic configuration; and a user equipment served by a base station of an operator B has a relatively large requirement on an uplink service, which requires that the serving base station selects a TDD ratio having more uplink sub-frames as a basic configuration. However, if a preferred frequency band of the operator A and a preferred frequency band of the operator B are close or the operator A or B uses a part of a preferred frequency band of the other one, in order to prevent possible mutual interference of the different operators at a same frequency band or adjacent frequency bands, the TDD ratios of the two need to be basically the same. Here, the base station of the operator A and the base station of the operator B may perform coordination through the declaring channel, so that the TDD ratios of the two are basically the same. For example, the base station of the operator A or the base station of the operator B may issue a broadcast message on the declaring channel, so that a base station of another operator may determine, according to its own service load situation, whether a configured TDD ratio may be or needs to be altered, so as to satisfy a demand of the another operator and to make interference between devices of different operators be as less as possible. Under this implementation scenario, the broadcast information sent by the base station may include: a pre-adopted TDD ratio, a user equipment service type, and a user equipment service level, if the another operator cannot alter the configured TDD ratio, the base station of the operator A or the base station of the operator B may acquire the situation by obtaining the broadcast information, so as to further adjust its own TDD ratio, so that the interference between the devices of different operators is as less as possible. The foregoing procedure is also applicable when base stations of more than two different operators exist in a same geographical area.

It should be noted that, when the first base station needs to transmit data, the first base station usually preferentially uses its own preferred frequency band to transmit data, and the first base station may also acquire, through broadcast information sent by another base station, whether the another base station uses the preferred frequency band of the first base station to transmit data. That is, the first base station may obtain second broadcast information sent by at least one third base station, where the second broadcast information carries usage information of the preferred frequency band of the first base station by the third base station. The third base station may also be the second base station sending the first broadcast information, or may also be another base station in an area to which the first base station belongs. If the first base station determines, by using the second broadcast information sent by the third base station, that the third base station uses the preferred frequency band of the first base station to transmit data, after second set time, the first base station may use its own preferred frequency band to transmit data.

Further, the first base station may indicate, by sending or not sending the third broadcast information, usage information of the preferred frequency band of the first base station by the first base station, so that the third base station may exit from all or a part of the used preferred frequency band of the first base station after set time, thereby preventing mutual interference between the first base station and the third base station.

The second broadcast information may be sent on the declaring channel occupying the public frequency band, or may be sent on the declaring channel occupying a part of a preferred frequency band of the third base station. Optionally, the second broadcast information may be periodically sent, or may be sent when usage of the preferred frequency band of the third base station is changed, or may be sent under a scenario that usage of a preferred frequency band of another base station by the third base station is changed. A period of sending the second broadcast information by the third base station may be configured by the mechanism or the entity having the resource allocation and management functions.

Optionally, the second broadcast information sent by the third base station may also carry information such as basic information of a preferred frequency band allocated to the third base station, and a use ratio of the preferred frequency band allocated to the third base station. In addition, the second broadcast information sent by the third base station may also include basic information of the third base station, for example, may include time division duplexing TDD ratio information used by the third base station.

On the declaring channel, the broadcast information sent by the base stations of multiple operators, for example, the first broadcast information sent by the at least one second base station, and/or the third broadcast information sent by the at least one first base station, and/or the second broadcast information sent by the at least one third base station, may implement orthogonality in a manner, such as time division multiplexing, frequency division multiplexing, code division multiplexing, or space multiplexing, may also implement orthogonality in a combined form of the foregoing manners, and may also implement orthogonality in other multiplexing manners, so as to implement that the broadcast information of the base station of each operator is sent on the declaring channel without interference.

The embodiment of the present invention may be applicable to various implementation scenarios, for example, under an implementation scenario, at an initial stage of deployment of a base station, although an operator owns a frequency band resource in certain geographical areas, in consideration of aspects such as service planning and service load, it is not considered that the base station is deployed in the geographical area in a period of time, so that for other operators having deployment of a base station in the geographical area, preferred frequency band resources of the operators cannot be multiplexed, thereby resulting in wastes of the frequency band resources in a certain geographical area. Under another implementation scenario, an operator dynamically deploys some base stations in a certain geographical area, these base stations may be low-power base stations, for example, Pico and Micro, and may also be other base stations having a dynamical power on or power off operation. The base stations may dynamically select to be power on or power off, so as to adapt to demands of other aspects such as service load and power saving. For example, when a service load of a certain area is relatively low, the base station may select to be power off, and in this case, a frequency band resource used by the base station is released in a period of time. In the spectrum allocation method provided by the embodiment of the present invention, the foregoing frequency band resource may be effectively utilized. It may be understood that the foregoing is only several typical implementation scenarios of the spectrum allocation method provided by the embodiment, but is not used to limit the embodiment of the present invention.

In the spectrum allocation method provided by this embodiment, a base station may determine, by using broadcast information issued by another base station, usage of a preferred frequency band of the another base station, to determine use of the preferred frequency band of the another base station, so that in a case of ensuring that devices of different operators do not interfere with one another, a spectrum use ratio is maximized, and at the same time, the different operators are enabled to obtain satisfied and fair spectrum use experience.

Figure 3:
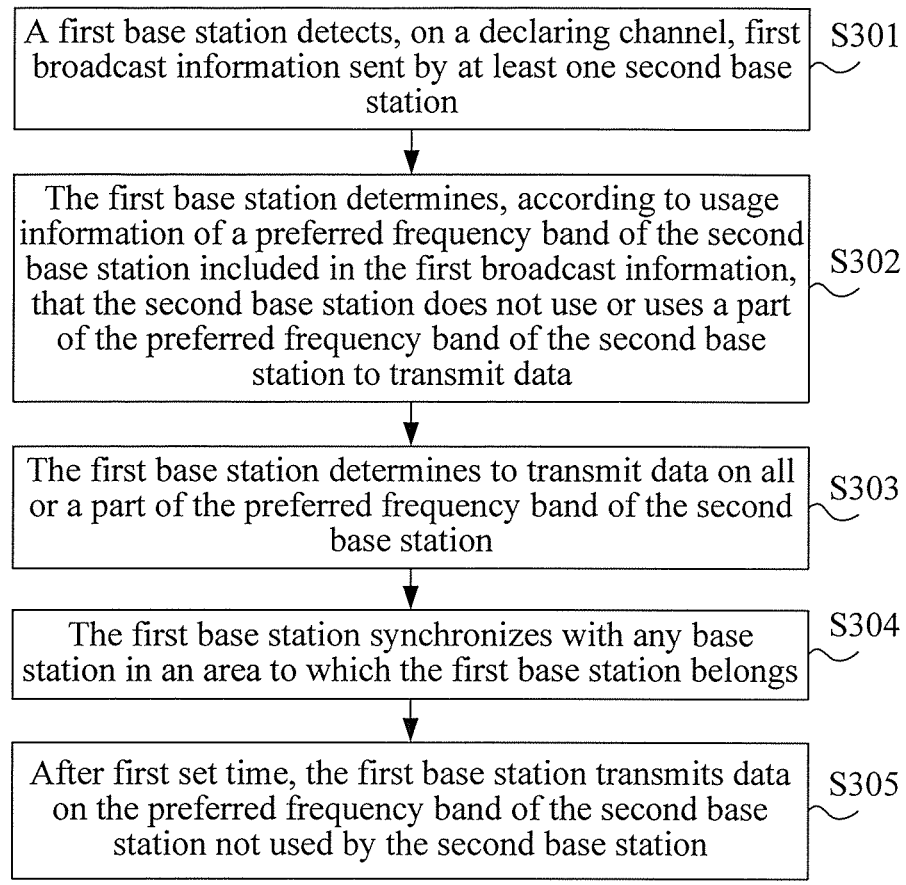
FIG. 3 is a flowchart of another embodiment of a spectrum allocation method provided by the present invention.

FIG. 3 is a flowchart of another embodiment of a spectrum allocation method provided by the present invention, where as shown in FIG. 3, in this embodiment, an operator deploys a first base station, and by obtaining broadcast information of at least one second base station, it is determined that the second base station does not use a preferred frequency band, and it is determined to use the preferred frequency band of the second base station. The method includes:

S301: A first base station detects, on a declaring channel, first broadcast information sent by at least one second base station.

S302: The first base station determines, according to usage information of a preferred frequency band of the second base station included in the first broadcast information, that the second base station does not use or uses a part of the preferred frequency band of the second base station to transmit data.

S303: The first base station determines to transmit data on all or a part of the preferred frequency band of the second base station.

If the first base station determines, according to the first broadcast information, that the second base station does not use or uses a part of the preferred frequency band of the second base station to transmit data, the first base station may send third broadcast information on a resource predefined by the declaring channel, where the third broadcast information includes the usage information of the preferred frequency band of the second base station by the first base station, for example, may be used to represent that the first base station transmits data on all or a part of the preferred frequency band of the second base station. It may be understood that, the first base station may transmit data on its own preferred frequency band, and under this implementation scenario, the third broadcast information sent by the first base station may include usage information of the preferred frequency band of the first base station, so that a base station of another operator may determine, according to the third broadcast information, use of the preferred frequency band of the first base station.

It should be noted that, if at least two first base stations determine, according to the first broadcast information, that the second base station does not use or uses a part of the preferred frequency band of the second base station, the at least two first base stations may preferentially use, according to their respective service load situations, their respective preferred frequency bands, and when their respective preferred frequency bands still cannot satisfy a service load, the at least two first base stations may determine, by adopting a coordination mechanism, the use of the preferred frequency band of the second base station. For example, a percentage of using the preferred frequency band of the second base station by each first base station may be negotiated, where the percentage may be determined according to a service load of each first base station, may also adopt a fixed proportion allocation manner, and may also be determined through other coordination mechanisms.

S304: The first base station synchronizes with any base station in an area to which the first base station belongs.

The at least one second base station sends the first broadcast information, so that the first base station may synchronize with any second base station.

Specifically, the first base station obtains, according to a synchronization channel and/or a synchronization sequence of any base station in the area to which the first base station belongs, synchronization information of any base station in the area to which the first base station belongs, where the synchronization channel and/or the synchronization sequence is sent on a public frequency band in the area to which the first base station belongs, or is sent on a part of a preferred frequency band of any base station in the area to which the first base station belongs.

It should be noted that, in this embodiment, that no matter whether the second base station uses its own preferred frequency band, the second base station sends the first broadcast information is taken as an example for description. Under an implementation scenario that the second base station may not send the first broadcast information, if the first base station does not detect, in a certain period of time, first broadcast information issued on the declaring channel by any second base station in the area to which the first base station belongs, the first base station does not need to execute the synchronization operation of S304.

S305: After first set time, the first base station transmits data on the preferred frequency band of the second base station not used by the second base station.

The first base station may set, according to synchronization information of an existing system in the area to which the first base station belongs, its own synchronization information, and herein, the synchronization information of the existing system may be synchronization information of any base station accessing the area to which the first base station belongs.

Optionally, the synchronization information of any accessing base station may be synchronization information adopted on the declaring channel, or may also be synchronization information adopted on the preferred frequency band for sending data, and herein, the preferred frequency band may be a preferred frequency band of any base station, or may also be a preferred frequency band of another base station.

Optionally, the synchronization information of any accessing base station may be borne by the synchronization channel or the synchronization sequence, and the synchronization channel or the synchronization sequence may uniquely mark the synchronization information of any accessing base station.

Optionally, the synchronization channel or the synchronization sequence may be sent on the public frequency band, or on the preferred frequency band. In addition, the synchronization information of the existing system may also be other synchronization information, for example, absolute time, which is not limited herein. For example, a subsequently deployed base station of the operator may set its own timing information according to timing information which is of a deployed base station of another operator or a deployed base station of a current operator and is on the declaring channel, or set its own timing information according to timing information which is of a deployed base station of another operator or a deployed base station of a current operator and is on the preferred frequency band, so that frame boundaries of frame structures adopted by the base stations of different operators may align with one another; or the subsequently deployed base station of the operator may set its own timing information according to absolute time of the system, so that frame boundaries of a frame structure adopted by the subsequently deployed base station of the operator may be aligned with frame boundaries of frame structures adopted by the deployed base station of the another operator or the deployed base station of the current operator.

Optionally, the synchronization information of the different base stations has a time delay, which may be compensated by using an existing technology, for example, an air interface time delay may be eliminated through a random access channel (Random Access Channel, RACH), so that the frame boundaries of the different base stations may be aligned as much as possible.

After the first base station sets its own synchronization information according to the synchronization information of the accessing system, after certain set time, the first base station transmits data on its own preferred frequency band, or transmits data on the preferred frequency band of the second base station not used by the second base station. Herein, the set time may be commonly known by the different operators, a principle of setting the set time may ensure that base stations deployed by different operators do not generate mutual interference on a same frequency band resource.

It should be noted that, when the first base station sets its own synchronization information according to the synchronization information of the existing system, a problem that base stations of a same operator in different areas are asynchronous may exist. For example, in an area one, when a base station A belonging to an operator 1 is first deployed, and a base station B belonging to an operator 2 is subsequently deployed in the area, the base station B may obtain its own synchronization information according to synchronization information of the base station A; but in an area two, when the base station B belonging to the operator 2 is first deployed, and the base station A belonging to the operator 1 is subsequently deployed in the area, the base station A may obtain its own synchronization information according to synchronization information of the base station B. With expansion of services, deployment scopes of the area one and the area two may be increasingly penetrated, so as to increasingly form an area three, where the area three is an overlapping area of the area one and the area two, and in the area three, a problem that base stations belonging to a same operator are asynchronous may exist. Under this implementation scenario, in order to reduce as much as possible or prevent the mutual interference between the different base stations, a base station deployed in a scope of the area three may synchronize with a base station with a strongest transmission signal in the area one and the area two.

In the spectrum allocation method provided by this embodiment, a base station may determine, by using broadcast information issued by another base station, usage of a preferred frequency band of the another base station, and if all or a part of the preferred frequency band resource of the another base station is not used, the base station may use the preferred resource not used by the another base station to transmit data, so that in a case of ensuring that devices of different operators do not interfere with one another, a spectrum use ratio is maximized, and at the same time, the different operators are enabled to obtain satisfied and fair spectrum use experience.

Figure 4:
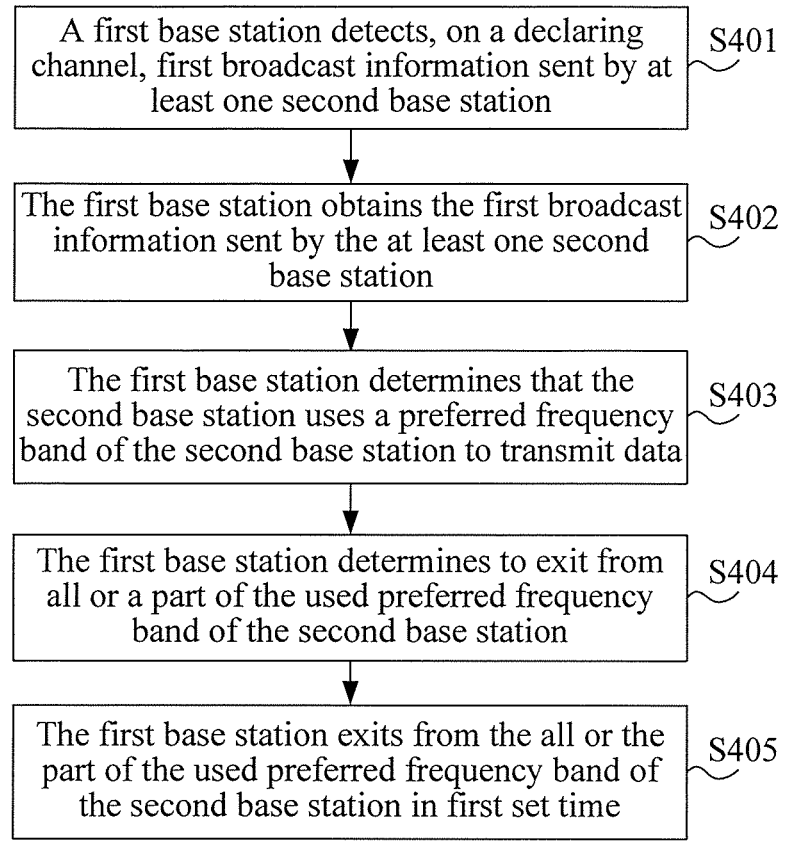
FIG. 4 is a flowchart of still another embodiment of a spectrum allocation method provided by the present invention.

FIG. 4 is a flowchart of further another embodiment of a spectrum allocation method provided by the present invention, where as shown in FIG. 4, in this embodiment, by obtaining broadcast information of at least one second base station, a first base station using a preferred frequency band of the second base station determines that the second base station already uses the preferred frequency band, and exits from the used preferred frequency band of the second base station. The method includes:

S401: A first base station detects, on a declaring channel, first broadcast information sent by at least one second base station.

S402: The first base station obtains the first broadcast information sent by the at least one second base station.

S403: The first base station determines that the second base station uses a preferred frequency band of the second base station to transmit data.

S404: The first base station determines to exit from all or a part of the used preferred frequency band of the second base station.

S405: The first base station exits from the all or the part of the used preferred frequency band of the second base station in first set time.

In this embodiment, if the first base station determines, according to the first broadcast information sent by the second base station, that the second base station already uses or prepares to use the preferred frequency band of the second base station, the first base station may release the all or the part of the used preferred frequency band of the second base station after the first set time.

Further, the first base station may send third broadcast information on the declaring channel, where the third broadcast information includes usage information of the preferred frequency band of the second base station by the first base station, and is used to indicate that the first base station releases the all or the part of the used preferred frequency band of the second base station.

It should be noted that, when the first base station does not serve a user in an area to which the first base station belongs, the first base station may exit from use of its own preferred frequency band and the preferred frequency band of the second base station, and indicates, by sending the third broadcast information, usage of its own preferred frequency band and the preferred frequency band of the second base station, so that a base station of another operator can use the preferred frequency band of the first base station or use the preferred frequency band of the second base station through the third broadcast information.

It should be noted that, if the first broadcast information sent by the second base station indicates that the second base station will use the preferred frequency band of the second base station to transmit data, that is, in S403, the second base station does not use the preferred frequency band of the second base station to transmit data. After the first set time, the second base station uses all or a part of the preferred frequency band of the second base station to transmit data, thereby preventing the first base station and the second base station from generating mutual interference due to use of the preferred frequency band of the second base station.

In the spectrum allocation method provided by this embodiment, a base station may determine, by using broadcast information issued by another base station, usage of a preferred frequency band of the another base station, and if in a procedure of using a preferred frequency band resource of the another base station, the base station finds that the another base station already uses or will use the preferred frequency band of the another base station to transmit data, the base station may exit from the used preferred frequency band of the another base station, so that in a case of ensuring that devices of different operators do not interfere with one another, a spectrum use ratio is maximized, and at the same time, the different operators are enabled to obtain satisfied and fair spectrum use experience.

Figure 5:
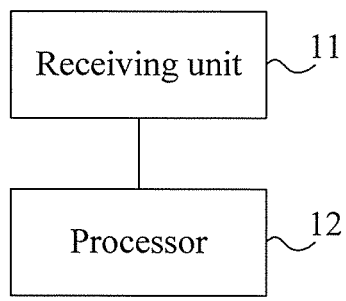
FIG. 5 is a schematic structural diagram of an embodiment of a base station provided by the present invention.

FIG. 5 is a schematic structural diagram of an embodiment of a first base station provided by the present invention, where as shown in FIG. 5, the first base station includes: a receiving unit 11 and a processor 12; where the receiving unit 11 is configured to obtain first broadcast information sent by at least one second base station; and the processor 12 is configured to determine, according to the first broadcast information, usage of a preferred frequency band of the at least one second base station; and determine, according to the usage of the preferred frequency band of the at least one second base station, use of the preferred frequency band of the at least one second base station by the first base station.

Optionally, the processor 12 may be specifically configured to: if the receiving unit 11 obtains the first broadcast information sent by the second base station, determine that the second base station uses the preferred frequency band of the second base station to transmit data; if the receiving unit 11 does not obtain the first broadcast information sent by the second base station, determine that the second base station does not use the preferred frequency band of the second base station to transmit data; or if the receiving unit 11 does not obtain the first broadcast information sent by the second base station, determine that the second base station uses the preferred frequency band of the second base station to transmit data; if the receiving unit 11 obtains the first broadcast information sent by the second base station, determine that the second base station does not use the preferred frequency band of the second base station to transmit data; or if the first broadcast information includes usage information of the preferred frequency band of the second base station, determine, according to the usage information of the preferred frequency band, that the second base station uses/ does not use the preferred frequency band of the second base station to transmit data.

Optionally, the processor 12 may be specifically configured to: if it is determined, according to the first broadcast information, that the second base station does not use or uses a part of the preferred frequency band of the second base station to transmit data, determine to transmit data on all or a part of the preferred frequency band of the second base station; or if it is determined, according to the first broadcast information, that the second base station uses the preferred frequency band of the second base station to transmit data, determine to exit from all or a part of the used preferred frequency band of the second base station.

Optionally, the processor 12 may be further configured to exit from the all or the part of the used preferred frequency band of the second base station after first set time.

Optionally, the processor 12 may be further configured to synchronize with any base station in an area to which the base station belongs.

Optionally, the processor 12 may be specifically configured to obtain, according to a synchronization channel and/or a synchronization sequence of any base station in the area to which the base station belongs, synchronization information of any base station in the area to which the base station belongs, where the synchronization channel and/or the synchronization sequence is sent on a public frequency band in the area to which the base station belongs, or is sent on a part of a preferred frequency band of any base station in the area to which the base station belongs.

Optionally, the processor 12 may be further configured to transmit data on a preferred frequency band of the first base station.

Optionally, the receiving unit 11 may be further configured to obtain second broadcast information sent by at least one third base station, where the second broadcast information carries usage information of the preferred frequency band of the first base station by the third base station.

Optionally, the processor 12 may be further configured to, if it is determined, according to the usage information of the preferred frequency band of the first base station by the third base station, that the third base station transmits data on the preferred frequency band of the base station, transmit data on the preferred frequency band of the base station after second set time.

Figure 6:
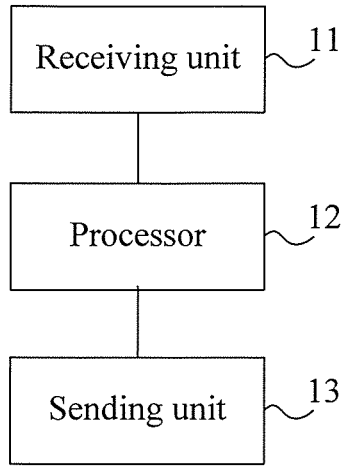
FIG. 6 is a schematic structural diagram of another embodiment of a base station provided by the present invention.

FIG. 6 is a schematic structural diagram of another embodiment of a base station provided by the present invention, where as shown in FIG. 6, the base station includes: a receiving unit 11, a processor 12, and a sending unit 13; where the sending unit 13 is configured to send third broadcast information, where the third broadcast information includes usage information of a preferred frequency band of a second base station by the base station.

Optionally, first broadcast information sent by the second base station may be sent on a declaring channel, and the declaring channel may occupy a public frequency band in an area to which the base station belongs, or may also occupy the preferred frequency band of the second base station;

and/or, the third broadcast information sent by the sending unit 13 is sent on the declaring channel, and the declaring channel occupies the public frequency band in the area to which the base station belongs, or occupies a preferred frequency band of the base station;

and/or, second broadcast information sent by a third base station is sent on the declaring channel, and the declaring channel occupies the public frequency band in the area to which the base station belongs, or occupies a preferred frequency band of the third base station.

Optionally, if the declaring channel occupies the public frequency band in the area to which the base station belongs, first broadcast information sent by at least one second base station, and/or the third broadcast information sent by the sending unit 13, and/or the second broadcast information sent by the third base station may perform orthogonality in any one or more combined manners: a time division manner, a frequency division manner, a code division manner, or a space division manner.

Optionally, the first broadcast information further includes time division duplexing TDD ratio information used by the second base station, and/or, the third broadcast information further includes TDD ratio information used by the base station, and/or, the second broadcast information further includes TDD ratio information used by the third base station.

The base station provided by the embodiment of the present invention corresponds to the spectrum allocation method provided by the present invention, and is an execution device of the spectrum allocation method, and for a specific procedure of executing the spectrum allocation method, reference may be made to relevant description in the method embodiments corresponding to FIG. 1 to FIG. 4 in the present invention, and details are not repeatedly described herein.

In the base station provided by the present invention, the base station may determine, by using broadcast information issued by another base station, usage of a preferred frequency band of the another base station, to determine use of the preferred frequency band of the another base station, so that in a case of ensuring that devices of different operators do not interfere with one another, a spectrum use ratio is maximized, and at the same time, the different operators are enabled to obtain satisfied and fair spectrum use experience.

Figure 7:
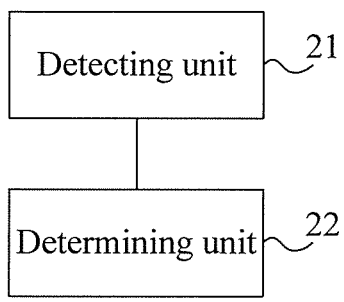
FIG. 7 is a schematic structural diagram of another embodiment of a base station provided by the present invention.

FIG. 7 is a schematic structural diagram of another embodiment of a first base station provided by the present invention, where as shown in FIG. 7, the first base station includes: a detecting unit 21 and a determining unit 22; where the detecting unit 21 is configured to determine, according to first broadcast information sent by at least one second base station, usage of a preferred frequency band of the at least one second base station; and the determining unit 22 is configured to determine, according to the usage of the preferred frequency band of the at least one second base station, use of the preferred frequency band of the at least one second base station by the first base station.

Optionally, the detecting unit 21 may be specifically configured to: if the first broadcast information sent by the second base station is obtained, determine that the second base station uses the preferred frequency band of the second base station to transmit data; if the first broadcast information sent by the second base station is not obtained, determine that the second base station does not use the preferred frequency band of the second base station to transmit data; or if the first broadcast information sent by the second base station is not obtained, determine that the second base station uses the preferred frequency band of the second base station to transmit data; if the first broadcast information sent by the second base station is obtained, determine that the second base station does not use the preferred frequency band of the second base station to transmit data; or if the first broadcast information includes usage information of the preferred frequency band of the second base station, determine, according to the usage information of the preferred frequency band of the second base station, that the second base station uses/does not use the preferred frequency band of the second base station to transmit data.

Optionally, the determining unit 22 may be specifically configured to: if the detecting unit determines, according to the first broadcast information, that the second base station does not use or uses a part of the preferred frequency band of the second base station to transmit data, determine to transmit data on all or a part of the preferred frequency band of the second base station; or if the detecting unit determines, according to the first broadcast information, that the second base station uses the preferred frequency band of the second base station to transmit data, determine to exit from all or a part of the used preferred frequency band of the second base station.

Figure 8:
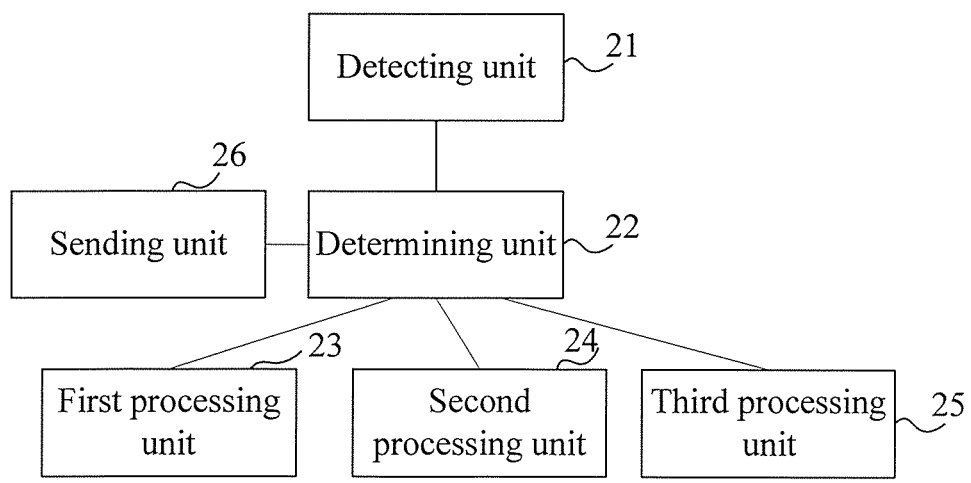
FIG. 8 is a schematic structural diagram of another embodiment of a base station provided by the present invention.

FIG. 8 is a schematic structural diagram of another embodiment of a base station provided by the present invention, where as shown in FIG. 8, the base station includes: a detecting unit 21 and a determining unit 22.

Further, the base station may further include:

a first processing unit 23, configured to, after the determining unit 22 determines to exit from all or a part of a used preferred frequency band of a second base station, exit from the all or the part of the used preferred frequency band of the second base station after first set time.

Further, the base station may further include:

a second processing unit 24, configured to, after the determining unit 22 determines to transmit data on all or a part of the preferred frequency band of the second base station, synchronize with any base station in an area to which the base station belongs.

Optionally, the second processing unit 24 may be specifically configured to obtain, according to a synchronization channel and/or a synchronization sequence of any base station in the area to which the base station belongs, synchronization information of any base station in the area to which the base station belongs, where the synchronization channel and/or the synchronization sequence is sent on a public frequency band in the area to which the base station belongs, or is sent on a part of a preferred frequency band of any base station in the area to which the base station belongs.

Further, the base station may further include:

a third processing unit 25, configured to transmit data on a preferred frequency band of the base station.

Optionally, the detecting unit 21 may be further configured to obtain second broadcast information sent by at least one third base station, where the second broadcast information carries usage information of the preferred frequency band of the first base station by the third base station.

Optionally, the determining unit 22 may be further configured to determine, according to the usage information of the preferred frequency band of the base station by the third base station, that the third base station transmits data on the preferred frequency band of the base station; and the third processing unit 25 may be specifically configured to, if the determining unit determines that the third base station transmits data on the preferred frequency band of the base station, transmit data on the preferred frequency band of the base station after second set time.

Further, the base station may further include:

a sending unit 26, configured to send third broadcast information, where the third broadcast information includes usage information of the preferred frequency band of the second base station by the first base station.

Optionally, the first broadcast information sent by the second base station may be sent on a declaring channel, and the declaring channel occupies the public frequency band in the area to which the base station belongs, or occupies the preferred frequency band of the second base station;

and/or, the third broadcast information sent by the sending unit 26 may be sent on the declaring channel, and the declaring channel occupies the public frequency band in the area to which the base station belongs, or occupies the preferred frequency band of the base station;

and/or, the second broadcast information sent by the third base station may be sent on the declaring channel, and the declaring channel occupies the public frequency band in the area to which the base station belongs, or occupies a preferred frequency band of the third base station.

Optionally, if the declaring channel occupies the public frequency band in the area to which the base station belongs, the first broadcast information sent by the at least one second base station, and/or the third broadcast information sent by the sending unit 26, and/or the second broadcast information sent by the third base station may perform orthogonality in any one or more combined manners: a time division manner, a frequency division manner, a code division manner, or a space division manner.

Optionally, the first broadcast information may further include time division duplexing TDD ratio information used by the second base station, and/or, the third broadcast information may further include TDD ratio information used by the first base station, and/or, the second broadcast information may further include TDD ratio information used by the third base station.

The base station provided by the embodiment of the present invention corresponds to the spectrum allocation method provided by the present invention, and is an execution device of the spectrum allocation method, and for a specific procedure of executing the spectrum allocation method, reference may be made to relevant description in the method embodiments corresponding to FIG. 1 to FIG. 4 in the present invention, and details are not repeatedly described herein.

In the base station provided by the present invention, the base station may determine, by using broadcast information issued by another base station, usage of a preferred frequency band of the another base station, to determine use of the preferred frequency band of the another base station, so that in a case of ensuring that devices of different operators do not interfere with one another, a spectrum use ratio is maximized, and at the same time, the different operators are enabled to obtain satisfied and fair spectrum use experience.

Persons skilled in the art may clearly understand that, for the purpose of convenient and brief description, dividing of the foregoing functional modules is taken as an example for description, in actual implementation, the foregoing functions may be allocated, according to a requirement, to different functional modules for implementation, that is, an internal structure of the apparatus is divided into different functional modules to implement all or part of the functions described above. For a detailed working process of the foregoing system, apparatus and unit, reference may be made to the corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, dividing of the modules or units is merely a kind of logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may also be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such understanding, the technical solutions of the present invention essentially, or the part contributing to the prior art, or all or a part of the technical solutions may be embodied in a form of a software product. The computer software product is stored in a storage medium and includes several instructions for instructing a computer device (which may be a personal computer, a server, or a network device, or the like) or a processor (processor) to perform all or a part of the steps of the methods described in the embodiments of the present application. The foregoing storage medium includes: any medium that is capable of storing program codes, such as a USB flash disk, a removable hard disk, a read-only memory (ROM, Read-Only Memory), a random access memory (RAM, Random Access Memory), a magnetic disk, or an optical disk.

It should be noted that, the foregoing embodiments are merely intended for describing the technical solutions of the present application other than limiting the present invention. Although the present application is described in detail with reference to the foregoing embodiments, persons of ordinary skill in the art should understand that they may still make modifications to the technical solutions described in the foregoing embodiments, or make equivalent replacements to some technical features of the technical solutions described in the foregoing embodiments; however, these modifications or replacements do not make the essence of the corresponding technical solutions depart from the spirit and scope of the technical solutions of the embodiments of the present invention.

What is claimed is:

1. A spectrum allocation method, comprising:
    determining, by a first base station, according to first broadcast information received from at least one second base station, usage of a preferred frequency band of the at least one second base station; and
    determining, by the first base station, according to the usage of the preferred frequency band of the at least one second base station, whether to transmit data on the preferred frequency band of the at least one second base station or to exit from the preferred frequency band of the at least one second base station, wherein the determining whether to transmit data on the preferred frequency band of the at least one second base station or to exit from the preferred frequency band of the at least one second base station comprises:

in response to determining, according to the first broadcast information, that the at least one second base station does not use or uses a part of the preferred frequency band of the at least one second base station to transmit data, determining, by the first base station, to transmit data on all or a part of the preferred frequency band of the at least one second base station; or in response to determining, according to the first broadcast information, that the at least one second base station uses the preferred frequency band of the at least one second base station to transmit data, determining, by the first base station, to exit from all or a part of the used preferred frequency band of the at least one second base station.

2. The method according to claim 1, wherein after determining, by the first base station, to exit from all or a part of the used preferred frequency band of the at least one second base station, the method further comprises:

exiting, by the first base station, from the all or the part of the used preferred frequency band of the at least one second base station after first set time.

3. The method according to claim 1, further comprising:
transmitting, by the first base station, data on a preferred frequency band of the first base station.

4. The method according to claim 3, wherein before transmitting, by the first base station, data on a preferred frequency band of the first base station, the method further comprises:

obtaining, by the first base station, second broadcast information received from at least one third base station, wherein the second broadcast information carries usage information of the preferred frequency band of the first base station by the at least one third base station.

5. The method according to claim 4, wherein transmitting, by the first base station, data on a preferred frequency band of the first base station comprises:

in response to determining, according to the usage information of the preferred frequency band of the first base station by the at least one third base station, that the at least one third base station transmits data on the preferred frequency band of the first base station, transmitting, by the first base station, data on the preferred frequency band of the first base station after second set time.

6. The method according to claim 5, wherein:
the first broadcast information received from the at least one second base station is received on a declaring channel, and the declaring channel occupies a public frequency band in an area to which the first base station belongs, or occupies the preferred frequency band of the at least one second base station; and/or
the third broadcast information sent by the first base station is sent on the declaring channel, and the declaring channel occupies the public frequency band in the area to which the first base station belongs, or occupies the preferred frequency band of the first base station; and/or
the second broadcast information received from at least one third base station is received on the declaring channel, and the declaring channel occupies the public frequency band in the area to which the first base station belongs, or occupies a preferred frequency band of the at least one third base station.

7. The method according to claim 5, wherein in response to a declaring channel occupying a public frequency band in an area to which the first base station belongs, the first broadcast information received from the at least one second base station, and/or the third broadcast information sent by the first base station, and/or the second broadcast information received from at least one third base station performs orthogonality in any one or more combined manners: a time division manner, a frequency division manner, a code division manner, or a space division manner.

8. The method according to claim 5, wherein:
the first broadcast information further comprises time division duplexing (TDD) ratio information used by the at least one second base station; and/or
the third broadcast information further comprises TDD ratio information used by the first base station; and/or
the second broadcast information further comprises TDD ratio information used by at least one third base station.

9. The method according to claim 6, wherein:
the first broadcast information further comprises time division duplexing (TDD) ratio information used by the at least one second base station; and/or
the third broadcast information further comprises TDD ratio information used by the first base station; and/or
the second broadcast information further comprises TDD ratio information used by the at least one third base station.

10. A first base station, comprising:
a receiver, configured to obtain first broadcast information received from at least one second base station; and
a processor, configured to determine, according to the first broadcast information, usage of a preferred frequency band of the at least one second base station; and determine, according to the usage of the preferred frequency band of the at least one second base station, whether to transmit data on the preferred frequency band of the at least one second base station or to exit from the preferred frequency band of the at least one second base station, wherein the processor configured to determine whether to transmit data on the preferred frequency band of the at least one second base station or to exit from the preferred frequency band of the at least one second base station comprises:

in response to determining, according to the first broadcast information, that the at least one second base station does not use or uses a part of the preferred frequency band of the at least one second base station to transmit data, the processor is configured to determine to transmit data on all or a part of the preferred frequency band of the at least one second base station; or in response to determining, according to the first broadcast information, that the at least one second base station uses the preferred frequency band of the at least one second base station to transmit data, the processor is configured to determine to exit from all or a part of the used preferred frequency band of the at least one second base station.

11. The first base station according to claim 10, wherein the processor is further configured to exit from the all or the part of the used preferred frequency band of the at least one second base station after first set time.

12. The first base station according to claim 10, wherein the processor is further configured to transmit data on a preferred frequency band of the first base station.

13. The first base station according to claim 12, wherein the receiver is further configured to obtain second broadcast information received from at least one third base station, wherein the second broadcast information carries usage information of the preferred frequency band of the first base station by the at least one third base station.

14. The first base station according to claim 13, wherein:
the first broadcast information received from the at least one second base station is received on a declaring channel, and the declaring channel occupies a public frequency band in an area to which the first base station belongs, or occupies the preferred frequency band of the at least one second base station; and/or
the third broadcast information sent by the transmitter is sent on the declaring channel, and the declaring channel occupies the public frequency band in the area to which the first base station belongs, or occupies the preferred frequency band of the first base station; and/or
the second broadcast information received from at least one third base station is received on the declaring channel, and the declaring channel occupies the public frequency band in the area to which the first base station belongs, or occupies a preferred frequency band of the at least one third base station.

15. The first base station according to claim 13, wherein in response to a declaring channel occupying a public frequency band in an area to which the first base station belongs, the first broadcast information received from the at least one second base station, and/or the third broadcast information sent by the transmitter, and/or the second broadcast information received from at least one third base station performs orthogonality in any one or more combined manners: a time division manner, a frequency division manner, a code division manner, or a space division manner.

16. The first base station according to claim 13, wherein:
the first broadcast information further comprises time division duplexing (TDD) ratio information used by the at least one second base station; and/or
the third broadcast information further comprises TDD ratio information used by the first base station; and/or
the second broadcast information further comprises TDD ratio information used by at least one third base station.

17. The first base station according to claim 15, wherein in response to the declaring channel occupying the public frequency band in the area to which the first base station belongs, the first broadcast information received from the at least one second base station, and/or the third broadcast information sent by the transmitter, and/or the second broadcast information received from the at least one third base station performs orthogonality in any one or more combined manners: a time division manner, a frequency division manner, a code division manner, or a space division manner.

18. The first base station according to claim 15, wherein:
the first broadcast information further comprises time division duplexing (TDD) ratio information used by the at least one second base station; and/or
the third broadcast information further comprises TDD ratio information used by the first base station; and/or
the second broadcast information further comprises TDD ratio information used by the at least one third base station.

* * * * *